United States Patent [19]

Thompson

[11] Patent Number: 5,617,118
[45] Date of Patent: Apr. 1, 1997

[54] MODE DEPENDENT MINIMUM FIFO FILL LEVEL CONTROLS PROCESSOR ACCESS TO VIDEO MEMORY

[75] Inventor: Stephen P. Thompson, Delray Beach, Fla.

[73] Assignee: International Business Machines Corporation, Armonk, N.Y.

[21] Appl. No.: 633,851

[22] Filed: Apr. 16, 1996

Related U.S. Application Data

[63] Continuation of Ser. No. 188,346, Jan. 27, 1994, abandoned, which is a continuation of Ser. No. 712,786, Jun. 10, 1991, abandoned.

[51] Int. Cl.$^6$ ..................................................... G09G 3/00
[52] U.S. Cl. ............................................. 345/200; 345/201
[58] Field of Search ............................. 345/3, 132, 133, 345/185, 200, 201, 203; 365/78, 221; 358/183; 395/250; 364/DIG. 1

[56] References Cited

U.S. PATENT DOCUMENTS

| | | | |
|---|---|---|---|
| 4,608,603 | 8/1986 | Johnson | 358/183 |
| 4,642,794 | 2/1987 | Lavelle et al. | 340/726 |
| 4,809,161 | 2/1989 | Torii et al. | 365/221 |
| 4,829,475 | 5/1989 | Ward et al. | 365/78 |
| 4,882,710 | 11/1989 | Hashimoto et al. | 340/799 |
| 4,942,553 | 7/1990 | Dalrymple et al. | 395/250 |
| 4,994,912 | 2/1991 | Lumelsky et al. | 340/814 |
| 5,027,330 | 6/1991 | Miller | 365/78 |
| 5,065,343 | 11/1991 | Inoue | 340/798 |
| 5,084,841 | 1/1992 | Williams | 365/221 |
| 5,088,053 | 2/1992 | Sprague et al. | 340/799 |
| 5,122,988 | 6/1992 | Graeve | 365/221 |
| 5,136,695 | 8/1992 | Goldshlag et al. | 340/799 |
| 5,150,109 | 9/1992 | Berry | 345/3 |
| 5,151,997 | 9/1992 | Bailey | 345/200 |
| 5,155,810 | 10/1992 | McNamara, Jr. et al. | 395/250 |
| 5,155,830 | 10/1992 | Kurashige | 364/DIG. 1 |

OTHER PUBLICATIONS

High–Speed CMOS DATA Book, IDT (Integrated Device Technology, Inc.) 1988, pp. 6–1 to 6–13.

Primary Examiner—Steven Saras
Attorney, Agent, or Firm—Martin J. McKinley

[57] ABSTRACT

A full screen of video data is stored in a video memory. A small block of video data to be imminently displayed on a raster scan display device is copied, two double-words (32 bits) at a time, from the video memory to a 6 by 32-bit first in, first out buffer (FIFO). A fill detection circuit determines when the fill level of the FIFO is at or above certain predetermined levels; specifically, 3, 5 and 6 double-words. The current operating mode is stored in a programmable mode register wherein each mode corresponds to a unique screen resolution. For example, one mode corresponds to a 1024 by 768 pixel resolution having 256 colors per pixel, while another mode corresponds to a 320 by 200 pixel resolution having 4 colors per pixel. A minimum fill level is selected by a level selection circuit depending on the current operating mode. Since the FIFO is emptied quickly in a high resolution mode, a higher minimum fill level is selected for high resolution modes than for low resolution modes. Processor access circuitry permits a central processor to write new video data to the video memory. The processor access circuitry, however, is disabled whenever the current fill level is below the minimum fill level set by the level selection circuit. Thus, central processor access to the video memory is only permitted when there is a minimum level of data in the FIFO, and that minimum level of data is selected according to the current operating mode.

8 Claims, 4 Drawing Sheets

MODE DEPENDENT MINIMUM FIFO FILL LEVEL CONTROLS PROCESSOR ACCESS TO VIDEO MEMORY

This is a continuation of application Ser. Nos. 08/188, 346 which is a continuation of 07/712,786 filed on Jan. 27, 1994 and Jun. 10, 1991; respectively, now both abandoned.

BACKGROUND OF THE INVENTION

This invention pertains to computer video graphics systems and, more particularly, to a video graphics system in which processor access to the video memory is dependent upon the current fill level of a FIFO refresh buffer and the current mode of operation.

To display video data on a raster scan display device, such as a cathode ray tube (CRT) display, a typical video system includes a dedicated video memory for storing a full screen of video data. The video data to be displayed is transferred from the computer's central processor to the video memory. A CRT controller (CRTC) generates the appropriate horizontal and vertical sync pulses and associated timing signals and, at the appropriate time, a bit, byte or block of video data is read from the video memory, processed, and displayed on the screen. Unless dual ported video memory (VRAM) is used, the central processor can not access the video memory at the same time that the bit, byte or block of data is read from the video memory to "refresh" the screen. Consequently, a video memory read operation for purposes of screen refresh usually has priority over a central processor write operation to the video memory. If this were not the case, display data would momentarily disappear from the screen during periods of processor video memory access. Therefore, processor access to the video memory is usually limited to periods of horizontal and vertical blanking.

As the resolution of video systems increases, both in terms of pixels per screen and colors per pixel, the total number of bits or bytes per screen increases dramatically, along with the time required for the processor to re-write one screen of data into the video memory. Consequently, if processor access to the video memory is limited only to periods of horizontal and vertical blanking, eventually a point is reached at which the processor can not re-write the video memory fast enough to keep up with images that are constantly changing. One way to help overcome this problem is to buffer the refresh output of the video memory with, for example, a first in, first out buffer (FIFO). With a buffer at the refresh output of the video memory, a block of video data can be rapidly copied from the video memory to the buffer. Data stored in the buffer is then used to refresh the screen, however, until the buffer is emptied to a predetermined level, the processor can write new video data into the video memory, even during non-blanking periods.

There are a number of video or "graphics" standards available today. For example, a low resolution standard or "mode" may display only 320 by 200 pixels, with each pixel being one of four colors. In a high resolution mode, 1024 by 768 pixels may be displayed with each pixel being one of 256 colors. The predetermined level to which the buffer must be emptied before central processor access to the video memory is inhibited is, however, dependent upon the mode of operation. For high speed, high resolution modes, the buffer will be emptied rapidly and, therefore, the fill level of the buffer must be relatively high to permit central processor access to the video memory. On the other hand, for low speed, low resolution modes the buffer will be emptied more slowly and, consequently, the fill level at which processor access to the video memory is denied is much lower. Thus, in a video system having a plurality of programmable operating modes and a refresh buffer, it is desirable to allow processor access to the video memory at a number of different buffer fill levels depending on the mode of operation. Although the fill level at which processor access is denied can be fixed for all modes of operation, a variable level provides increased performance. Accordingly, the invention described below adjusts the minimum fill level for processor video memory access as a function of the current operating mode of the video system.

SUMMARY OF THE INVENTION

Briefly, the invention is a video memory interface circuit that includes a first in, first out buffer (FIFO) having an input coupled to a video memory port. A fill level detection means is coupled to the FIFO. The fill level detection means detects at least two fill levels of the FIFO. The video memory interface also includes a programmable mode register. A level selection means is coupled between the fill level detection means and the mode register. The level selection means selects a first minimum fill level when the mode register is programmed to a first mode, and a second minimum fill level when the mode register is programmed to a second mode. A processor access means is coupled between a processor access port and the video memory port. The processor access means couples address and video data at the processor port to the video memory port. Also included is a means for disabling the processor access means when the current fill level of the FIFO is below the minimum fill level selected by the level selection means.

DESCRIPTION OF THE PREFERRED EMBODIMENT

Figure 1:
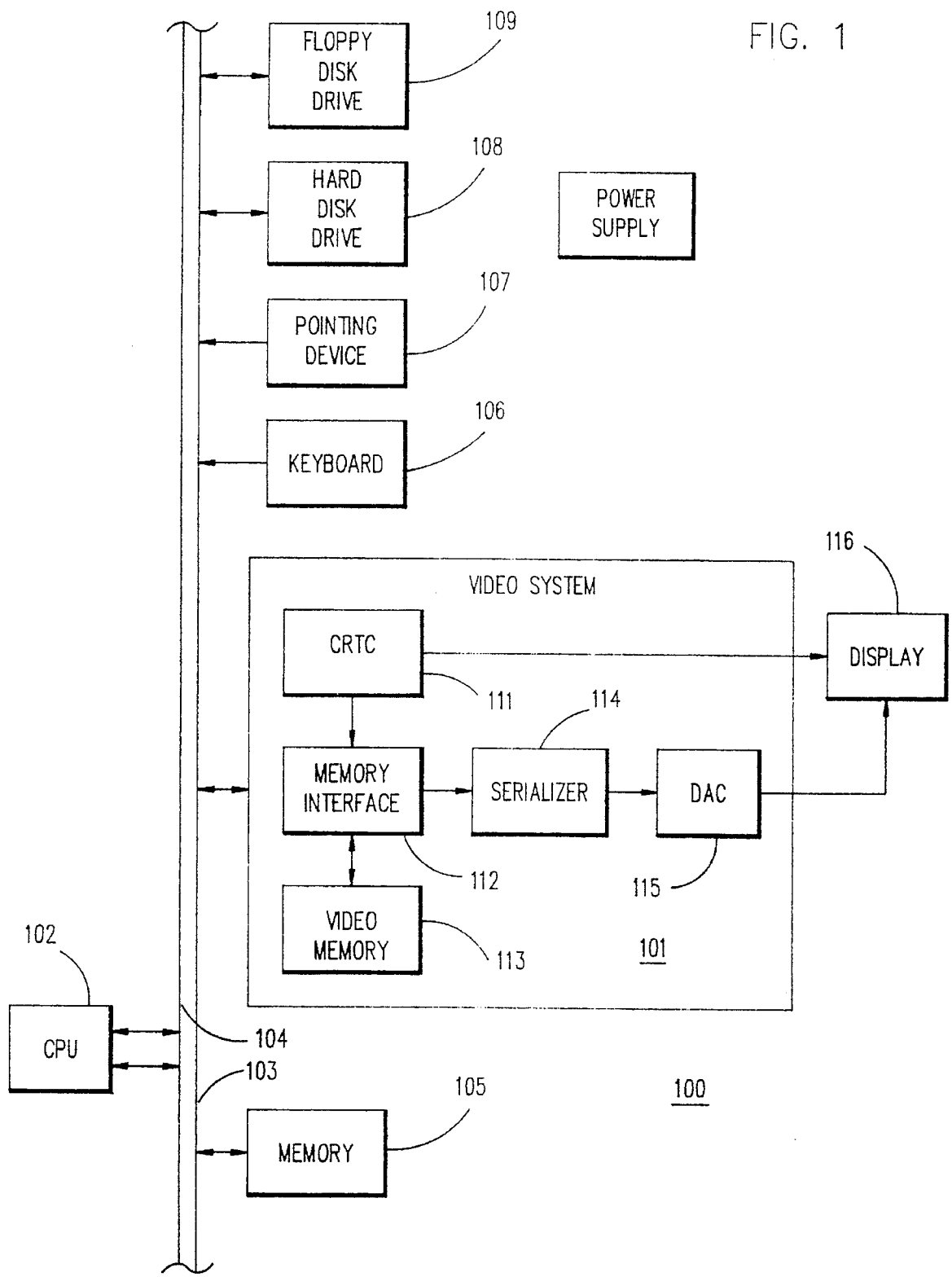
FIG. 1 is a block diagram of a computer including the video graphics system of the present invention.

A block diagram of a computer 100 including the video system 101 of the present invention is illustrated in FIG. 1. Referring to this figure, a central processor unit (CPU) 102 is coupled to a memory bus 103 and an input/output (I/O) bus 104. Although memory bus 103 and I/O bus 104 are illustrated as separate buses, they could be joined as one single bus. A semiconductor memory 105 is coupled to the memory bus 103 and a plurality of I/O devices 106–109 are coupled to the I/O bus 104; specifically, a keyboard 106, a pointing device such as a mouse or trackball 107, a hard disk drive 108, and a floppy disk drive 109. A power supply 110 supplies power to the computer.

The video system 101 is coupled to the I/O bus 104 and includes a cathode ray tube controller (CRTC) 111 of conventional design. CRTC 111 generates the horizontal and vertical sync pulses and other timing signals necessary to display video information on a raster scan display screen, such as a cathode ray tube (CRT). A memory interface 112 is described in more detail with reference to FIG. 2. A video memory 113 is coupled to the memory interface unit 112. Video memory 113 includes a plurality of dynamic random access memories (DRAMS) of conventional design. The output of the memory interface unit 112 is coupled to a serializer 114 and digital-to-analog converter (DAC) 115, both of conventional design. The serializer 114 converts the parallel output of the memory interface unit 112 into serial form, and the DAC 115 converts the serialized digital video information into analog voltages that represent the red, green and blue colors. A conventional raster scan display device 116, such as a CRT display, is used to display the video information.

Figure 2:
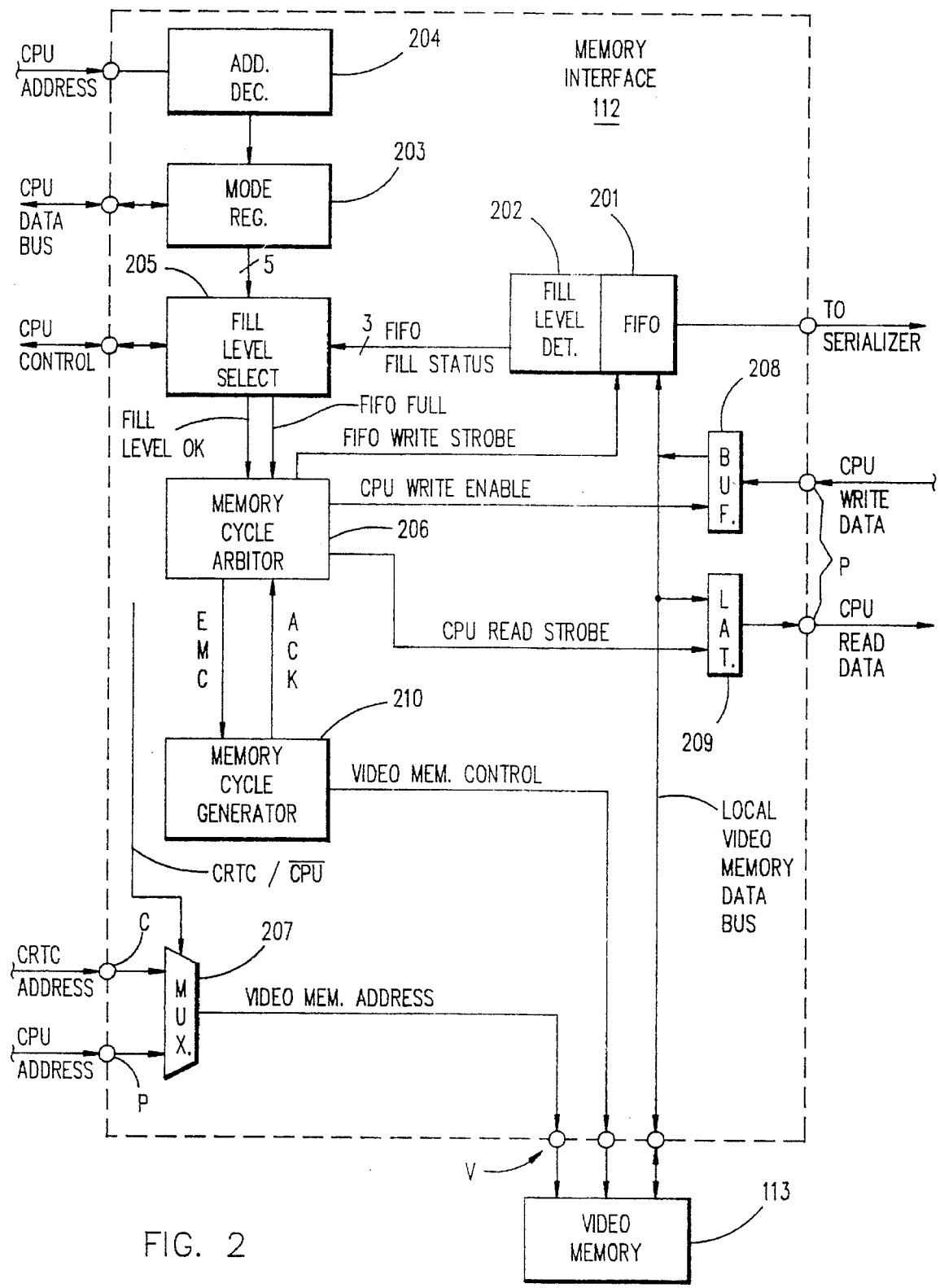
FIG. 2 is a block diagram of the video memory interface unit.

A detailed diagram of the video interface unit 112 is illustrated in FIG. 2. Referring to this figure, a conventional 6 by 32 bit first in, first out buffer (FIFO) temporarily stores up to 6 "double words" of video data, which are transferred to the serializer, one double word at a time. The convention used throughout this specification is that a byte=8 bits, a word=2 bytes, and a double word (DWord)=2 words. Consequently, a double word=4 bytes or 32 bits. The video data is copied from the video memory 113 to the FIFO 201, one double word at a time. A conventional Fill Level Detect Circuit 202 is coupled to the FIFO 201. The FIFO Fill Status output of Fill Level Detect Circuit 202 has three individual outputs to indicate when the minimum fill level of FIFO 201 is 3 DWords, 5 DWords and 6 Dwords.

The operating mode of the Video System 101 is loaded into Mode Register 203 from the computer's data bus. The Mode Register 203 is accessed at a unique address on the bus, as decoded by Address Decode Circuit 204. The Video System is capable of operating in a plurality of screen resolution modes, from a high resolution mode of 1024 by 768 pixels with 256 colors per pixel, to a low resolution mode of 320 by 200 pixels with only 4 colors per pixel. The Mode Register 203 includes 5 programmable bits. A first bit indicates the alpha-numeric mode, a second bit indicates that there are 8 bits per pixel, and the third, fourth and fifth bits are used to set the clock frequency and are referred to as Clock Select Bits 0, 1 and 2 (CS0, CS1 and CS2). In particular, the clock frequency is set according to the following table:

| CS2 | CS1 | CS0 | Frequency |
|---|---|---|---|
| 0 | 0 | 0 | 25 MHz |
| 0 | 0 | 1 | 28 MHz |
| 0 | 1 | 0 | <=28 MHz |
| 0 | 1 | 1 | 45 MHz |
| 1 | 0 | 0 | 42 MHz |

A Fill Level Select Circuit 205 selects the minimum FIFO fill level that's required to permit the CPU 102 to access the Video Memory 113. This selection of the minimum fill level is based on the current operating mode of the Video System, as programmed in the Mode Register 203. In general, a high minimum fill level (e.g., 6 DWords) is required for high resolution modes, while only a low minimum fill level (e.g., 3 DWords) is necessary for low resolution modes. When the actual fill level of the FIFO is at or above the minimum fill level, as selected by the Fill Level Select Circuit 205, the Fill Level OK output of the Select Circuit goes active. The Fill Level Circuit 205 is described in more detail with reference to FIG. 3. The following table lists the minimum fill levels as a function of operating mode:

| Mode Type | Bits/Pixel | Pixel Rate | Minimum Fill Level |
|---|---|---|---|
| Alpha-Num | N/A | <=28 MHz | 3 DWords |
| Alpha-Num | N/A | >28 MHz | 5 DWords |
| Graphics | <=4 | <=28 MHz | 3 DWords |
| Graphics | 8 | <=28 MHz | 5 DWords |
| Graphics | <=4 | >28 MHz | 5 DWords |
| Graphics | 8 | >28 MHz | 6 DWords |

A Memory Cycle Arbiter 206 controls access to the Video Memory 113 by shifting control of the Video Memory between the CRTC 111 and the CPU 102 at the appropriate time. The Memory Cycle Arbiter implements the state machine of FIG. 4 and it is of conventional arbiter design. Control of the address lines to the Video Memory 113 is provided by a conventional multiplexer, MUX 207, which is controlled by the CRTC/CPU-NOT output from the Memory Cycle Arbiter 206. When this line is active, the CRTC 111 addresses the Video Memory 113 via the CRTC port "C" and the Video Memory Port "V." When the CRTC/CPU-NOT output is not active, the CPU 102 addresses the Video Memory through the Central Processor Port "P". Thus, the Memory Cycle Arbiter 206 provides a means for enabling and disabling CPU access to the Video Memory 113 depending on the actual level of the FIFO relative to the minimum fill level selected by the Fill Level Select Circuit 205. In addition, when the CRTC/CPU-NOT line is inactive, the Memory Cycle Arbiter generates, in a conventional fashion, the CPU Write Enable and CPU Read Strobe signals necessary to write CPU data to Buffer 208 and read data from Latch 209, respectively. Thus, the MUX 207, the Buffer 208 and the Latch 209 provide a processor access means for coupling address and video data at the Processor Port "P" to the Video Memory Port "V."

The Memory Cycle Arbiter also generates, in a conventional fashion, an Execute Memory Cycle (EMC) command, which signals the Memory Cycle Generator to generate another cycle of Video Memory Control signals, such as the Row Address Select, Column Address Select, and Write Enable signals necessary to access the Video Memory 113. Memory Cycle Generator 210 is of conventional design and it responds with an Acknowledge (ACK) signal back to the Memory Cycle Arbiter 206 when it has completed the requested memory cycle.

Figure 3:
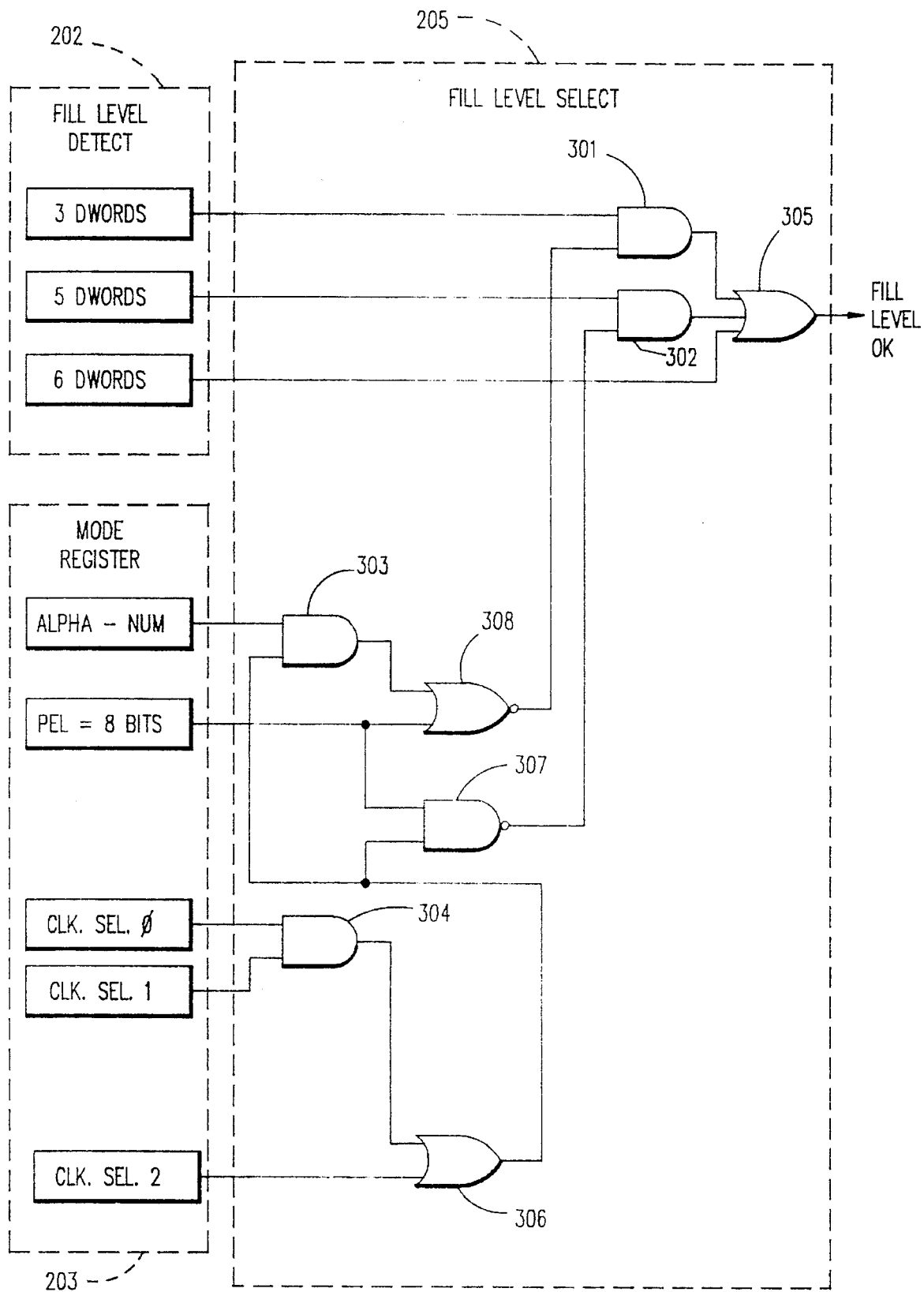
FIG. 3 is a schematic diagram of the fill level selection circuitry.

A schematic diagram of the Fill Level Select Circuit 205 is illustrated in FIG. 3. Referring to this figure, the Fill Level Select Circuit includes AND gates 301–304, OR gates 305–306, NAND gate 307 and NOR gate 308. The Fill Level Select Circuit selects a minimum fill level for processor video memory access based on the current state of the five bits in the Mode Register 203. The output of OR gate 305 is the Fill Level OK signal that indicates that the current FIFO fill level, as sensed by the Fill Level Detect Circuit 202, is at or above the minimum level selected by the Fill Level Select Circuit 205.

Figure 4:
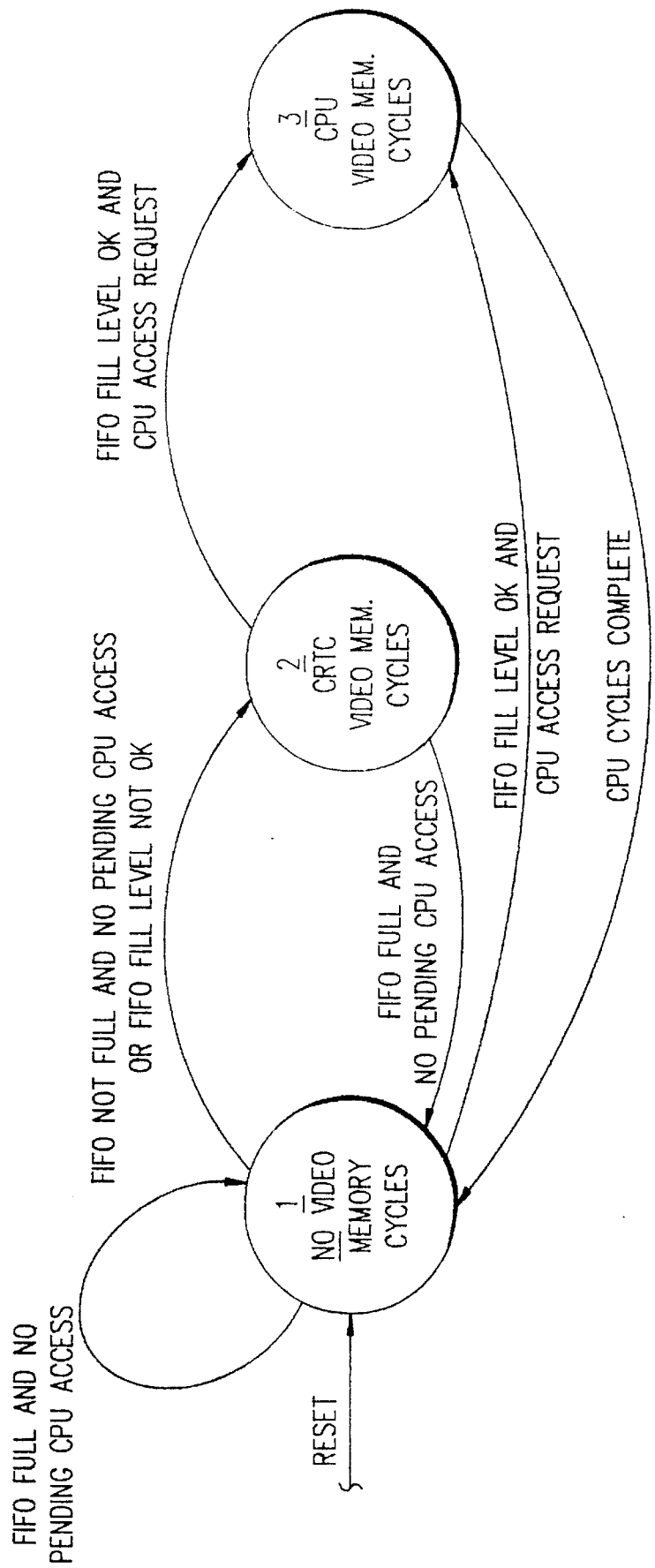
FIG. 4 is a state diagram illustrating the operation and construction of the memory cycle arbiter.

FIG. 4 is a state diagram of the Memory Cycle Arbiter 206. Referring to this figure in conjunction with FIG. 2, the Arbiter has three states and moves between states in response to changes in the FIFO and the current need for the CPU to access the video memory. The first state is an idle state in which the Arbiter waits until the FIFO is not completely full, or the CPU needs to access the video memory. In the second state, the CRTC has access to the Video Memory 113 and transfers video data to the FIFO until the FIFO is full, or the CPU needs access to the Video Memory and the Fill Level is OK. In state 3, the CPU has access to the Video Memory.

I claim as my invention:

1. A video adapter, comprising in combination:

a video memory;

a first in, first out video buffer ("FIFO") having an input coupled to said video memory and an output coupled to a video output port, said FIFO receiving video data from said video memory and transferring the video data to said video output port;

a mode register for storing a code that determines both the operating mode of said video adapter and a minimum fill level of said FIFO;

fill level detection and selection means coupled to said FIFO and said mode register for detecting and selecting a minimum fill level of said FIFO, said minimum fill level being determined by the code stored in said mode register;

a CRT controller;

a CPU access port;

a memory cycle generator, coupled to said video memory, for generating video memory cycles to cause data stored in said video memory to be transferred to said FIFO; and a memory cycle arbitor coupled to said memory cycle generator and said fill level detection and selection means and having at least three states, a first state in which no video memory cycles are generated, a second state in which CRT video memory cycles are generated, and a third state in which CPU video memory cycles are generated, said arbitor remaining in said first state in response to said FIFO being full and no pending CPU access requests, said arbitor moving from said first to said second state in response to said FIFO being not full and no pending CPU access request or in response to said FIFO fill level being below said minimum fill level, and said arbitor moving from said first to said third state in response to said FIFO fill level being above said minimum fill level and a CPU access request.

2. The video adapter of claim 1, wherein said arbitor moves from said second state to said first state in response to said FIFO being full and no pending CPU access requests, said arbitor moving from said second state to said third state in response to said FIFO being above said minimum fill level and a CPU access request.

3. The video adapter of claim 1, wherein said arbitor moves from said second state to said, first state in response to said FIFO being full and no pending CPU access requests, said arbitor moving from said second state to said third state in response to said FIFO being above said minimum fill level and a CPU access request, and said arbitor moving from said third state to said first state in response to the completion of a CPU access request.

4. The video adapter of claim 1, wherein said arbitor moves from said third state to said first state in response to the completion of a CPU access request.

5. A computer, comprising in combination:

at least one processor unit;

memory coupled to said processor unit via a memory bus;

a plurality of input/output ("I/O") devices coupled to said processor unit via an I/O bus;

a power supply for supplying power to said computer;

a video system coupled to said processor unit, said video system comprising:

a video memory;

a first in, first out video buffer ("FIFO") having an input coupled to said video memory and an output coupled to a video output port, said FIFO receiving video data from said video memory and transferring the video data to said video output port;

a mode register for storing a code that determines both the operating mode of said video system and a minimum fill level of said FIFO;

fill level detection and selection means coupled to said FIFO and said mode register for detecting and selecting a minimum fill level of said FIFO, said minimum fill level being determined by the code stored in said mode register;

a CRT controller;

a memory cycle generator, coupled to said video memory, for generating video memory cycles to cause data stored in said video memory to be transferred to said FIFO; and a memory cycle arbitor coupled to said memory cycle generator and said fill level detection and selection means and having at least three states, a first state in which no video memory cycles are generated, a second state in which CRT video memory cycles are generated, and a third state in which CPU video memory cycles are generated, said arbitor remaining in said first state in response to said FIFO being full and no pending CPU access requests, said arbitor moving from said first to said second state in response to said FIFO being not full and no pending CPU access request or in response to said FIFO fill level being below said minimum fill level, and said arbitor moving from said first to said third state in response to said FIFO fill level being above said minimum fill level and a CPU access request.

6. The computer of claim 5, wherein said arbitor moves from said second state to said first state in response to said FIFO being full and no pending CPU access requests, said arbitor moving from said second state to said third state in response to said FIFO being above said minimum fill level and a CPU access request.

7. The computer of claim 5, wherein said arbitor moves from said second state to said first state in response to said FIFO being full and no pending CPU access requests, said arbitor moving from said second state to said third state in response to said FIFO being above said minimum fill level and a (CPU access request, and said arbitor moving from said third state to said first state in response to the completion of a CPU access request.

8. The computer of claim 5, wherein said arbitor moves from said third state to said first state in response to the completion of a CPU access request.

\* \* \* \* \*